US012723519B2

(12) United States Patent
Murray et al.

(10) Patent No.: US 12,723,519 B2
(45) Date of Patent: Sep. 1, 2026

(54) ROTARY ASSEMBLY

(71) Applicant: ROLLS-ROYCE plc, London (GB)

(72) Inventors: Christopher A Murray, Nottingham (GB); Nicholas Howarth, Derby (GB)

(73) Assignee: ROLLS-ROYCE plc, London (GB)

( * ) Notice: Subject to any disclaimer, the term of this patent is extended or adjusted under 35 U.S.C. 154(b) by 117 days.

(21) Appl. No.: 18/379,976

(22) Filed: Oct. 13, 2023

(65) Prior Publication Data

US 2024/0151154 A1 May 9, 2024

(30) Foreign Application Priority Data

Nov. 8, 2022 (GB) ..................................... 2216582

(51) Int. Cl.

*F01D 17/16* (2006.01)
*F01D 1/30* (2006.01)
*F01D 17/14* (2006.01)
*F02C 7/277* (2006.01)
*F02C 9/20* (2006.01)

(52) U.S. Cl.

CPC ........... *F01D 17/162* (2013.01); *F01D 17/16* (2013.01); *F01D 1/30* (2013.01); *F01D 17/143* (2013.01); *F02C 7/277* (2013.01); *F02C 9/20* (2013.01)

(58) Field of Classification Search

CPC .......... F02C 7/277; F02C 9/20; F01D 17/162; F01D 17/16; F01D 1/30; F01D 17/143

See application file for complete search history.

(56) References Cited

U.S. PATENT DOCUMENTS 3,373,561 A * 3/1968 Jubb ......................... F02C 9/16 60/39.15
3,878,677 A 4/1975 Colvin (Continued)

FOREIGN PATENT DOCUMENTS

DE 10 2011 120555 A1 6/2013
EP 3 034 405 A1 6/2016

(Continued)

OTHER PUBLICATIONS

Jun. 8, 2022 Search Report issued in British Patent Application No. GB2118069.0.

(Continued)

*Primary Examiner* — Thomas P Burke

(74) *Attorney, Agent, or Firm* — Oliff PLC

(57) ABSTRACT

A rotary assembly for driving spool rotation includes a rotor and a flow modifier. The rotor is mechanically coupled to a spool of a gas turbine engine. The flow modifier receives flow from and/or direct flow to the rotor. The rotary assembly permits relative movement between the rotor and the flow modifier to move between: a turbine configuration wherein the rotor receives air from an external air source to drive the spool to rotate; and a compressor configuration wherein the rotor is driven to rotate by the spool and to receive and compress air from the gas turbine engine, and discharge the compressed air for supply to the airframe system. The rotary assembly also includes controller to control relative movement between the rotor and the flow modifier through a range of turbine positions of the turbine configuration to vary a torque applied to the rotor for driving the spool.

18 Claims, 7 Drawing Sheets

(56) References Cited

U.S. PATENT DOCUMENTS

| | | | | |
|---|---|---|---|---|
| 11,988,100 | B2 * | 5/2024 | Murray | F01D 1/30 |
| 2004/0076519 | A1 | 4/2004 | Halfmann et al. | |
| 2006/0042247 | A1 * | 3/2006 | Haugen | F02M 26/23 60/600 |
| 2011/0241344 | A1 | 10/2011 | Smith et al. | |
| 2015/0275769 | A1 | 10/2015 | Foutch et al. | |
| 2016/0167789 | A1 | 6/2016 | Knight et al. | |
| 2016/0237909 | A1 * | 8/2016 | Snape | F02C 7/185 |
| 2016/0238012 | A1 * | 8/2016 | Nejedly | F04D 29/4213 |
| 2017/0284297 | A1 * | 10/2017 | Nestico | F02C 9/20 |
| 2017/0342994 | A1 * | 11/2017 | Nesteroff | F04D 29/162 |
| 2017/0342995 | A1 * | 11/2017 | Ottow | F01D 11/22 |
| 2018/0079510 | A1 | 3/2018 | Bacic et al. | |
| 2021/0348564 | A1 * | 11/2021 | Mackin | F02C 7/047 |
| 2023/0184131 | A1 | 6/2023 | Murray | |

FOREIGN PATENT DOCUMENTS

| | | |
|---|---|---|
| EP | 3 056 714 A1 | 8/2016 |
| EP | 3 208 195 A1 | 8/2017 |
| EP | 3 514 350 A2 | 7/2019 |
| EP | 3 517 436 B1 | 5/2020 |
| EP | 3 517 437 B1 | 5/2020 |
| EP | 3 517 438 B1 | 6/2020 |
| GB | 1 228 297 A | 4/1971 |
| GB | 2 242 235 A | 9/1991 |

OTHER PUBLICATIONS

May 8, 2023 Extended Search Report issued in European Patent Application No. 22207104.5.

Aug. 31, 2023 Office Action issued in U.S. Appl. No. 17/988,472.

Nov. 28, 2023 Office Action issued in U.S. Appl. No. 17/988,472.

U.S. Appl. No. 17/988,473, filed Nov. 16, 2022 in the name of Murray.

Mar. 14, 2024 Extended Search Report issued in European Patent Application No. 23202772.2.

Feb. 16, 2024 Notice of Allowance issued in U.S. Appl. No. 17/988,472.

* cited by examiner

ROTARY ASSEMBLY

CROSS-REFERENCE TO RELATED APPLICATIONS

This specification is based upon and claims the benefit of priority from United Kingdom Patent Application No. 2216582.3, filed on 8 Nov. 2022, the entire contents of which are incorporated herein by reference.

TECHNICAL FIELD

The present disclosure relates to a rotary assembly for an aircraft. The disclosure also concerns a gas turbine engine having a rotary assembly and aircraft having rotary assemblies.

BACKGROUND

It is known to pressurise and ventilate a cabin of an aircraft using engine bleed air which is bled from a compressor section of the core of a gas turbine engine. Bleeding high pressure air from the gas turbine engine reduces its efficiency and thereby increases its fuel consumption.

Rotary assemblies (e.g., cabin blower assemblies) which make use of air which is bled from a lower pressure source of a gas turbine engine (such as a bypass duct) and which subsequently compress the engine bleed air prior to delivering it to the cabin are also known, as described in EP3517436 B1, EP3517437 B1 and EP3517438 B1.

SUMMARY

According to a first aspect, there is provided a rotary assembly for providing air to an airframe system, comprising: a rotor configured to be mechanically coupled to a spool of a gas turbine engine; a flow modifier configured to receive and/or direct flow to the rotor; wherein the rotary assembly is operable in a turbine configuration in which the rotor is configured to receive air from an external air source to drive the spool to rotate, and wherein the rotary assembly comprises a controller configured to control relative movement between the rotor and the flow modifier through a range of turbine positions of the turbine configuration to vary a torque applied to the rotor for driving the spool.

It may be that the rotary assembly is configured to permit relative movement between the rotor and the flow modifier to move between: the turbine configuration; and a compressor configuration in which the rotor is configured to be driven to rotate by the spool and to receive and compress air from the gas turbine engine, and discharge the compressed air for supply to the airframe system.

In the turbine configuration the rotor may drive the spool to rotate for starting the gas turbine engine. Additionally or alternatively, the turbine configuration may be used to drive the spool to rotate at a speed below a starting speed of the engine, for example to reduce or prevent the formation of thermal bow of engine components.

The rotary assembly may further comprise a variable transmission for mechanically coupling the rotor to the spool.

The rotary assembly may be configured so that a direction of rotation of the rotor in the turbine configuration is the same as a direction of rotation of the rotor in the compressor configuration.

The flow modifier may comprise a plurality of vanes. The flow modifier may comprise at least a first set of a plurality of vanes and a second set of a plurality vanes.

The flower modifier may be a fixed geometry flow modifier. The flow modifier may comprise fixed geometry vanes (e.g., non-rotating vanes), for example a first plurality of fixed geometry vanes and a second plurality of fixed geometry vanes.

It may be that the controller is configured to vary the torque applied to the rotor based on a rotational speed of the rotor or a rotational speed of the spool.

It may also be that the rotary assembly comprises an actuator arrangement for causing the relative movement between the rotor and flow modifier and the controller is configured to control the actuator arrangement to cause relative movement between the rotor and the flow modifier through the range of turbine positions of the turbine configuration to vary the torque applied to the rotor. The actuator arrangement may be configured to move the flow modifier relative to the rotor without changing a geometry of the flow modifier, which may be a fixed geometry.

It may be that the flow modifier comprises: a diffuser vane array comprising a plurality of diffuser vanes and configured to act together with the rotor to compress air received at the rotor in the compressor configuration; and a nozzle guide vane array comprising a plurality of nozzle guide vanes and configured to act together with the rotor to expand air received at the nozzle guide vane array in the turbine configuration. The controller may be configured to control the actuator arrangement to: cause relative movement between the rotor and the diffuser vane array so that the diffuser vane array is disposed around the rotor for operation in the compressor configuration; and cause relative movement between the rotor and the nozzle guide vane array so that the nozzle guide vane array is disposed around the rotor for operation in the turbine configuration.

The controller may be configured to vary the torque applied to the spool by controlling relative movement between the rotor and the flow modifier within the range of turbine positions to vary a fraction of air received by the flow modifier from the external air source which is directed to the rotor via the nozzle guide vane array. In particular, the controller may be configured to reduce the torque applied to the rotor by controlling relative movement between the rotor and the flow modifier within the range of turbine positions to reduce a fraction of air received by the flow modifier from the external air source which is directed to the rotor via the nozzle guide vane array.

In addition or instead, the controller may be configured to vary the torque applied to the rotor by controlling relative movement between the rotor and the flow modifier within the range of turbine positions to vary a flow split between air received by the flow modifier from the external air source which is directed to the rotor via the nozzle guide vane array and via the diffuser vane array. More specifically, the controller may be configured to reduce the torque applied to the rotor by controlling relative movement between the rotor and the flow modifier within the range of turbine positions to vary the flow split between air received by the flow modifier from the external air source which is directed to the rotor via the nozzle guide vane array and via the diffuser vane array such that: a fraction of air received by the flow modifier from the external air source which is directed to the rotor via the nozzle guide vane array is decreased; and a fraction of air received by the flow modifier from the external air source which is directed to the rotor via the diffuser vane array is increased.

Further, it may be that the controller is configured to control relative movement between the rotor and the flow modifier to maintain the fraction of air received by the flow modifier from the external air source which is directed to the rotor via the nozzle guide vane array as being greater than the fraction of air received by the flow modifier from the external air source which is directed to the rotor via the diffuser vane array when the rotary assembly is operated in the turbine configuration.

It may be that the actuator arrangement is configured to adjust an effective axial height of the diffuser vanes by varying an open area of an inlet interface between the rotor and the diffuser vane array, and/or by varying an open area of an outlet interface at a radially outer side of the diffuser vane array, wherein the effective axial height is with respect to a rotational axis of the rotor.

It may be that the diffuser vane array and the nozzle guide vane array are rigidly connected so as to form a combined vane array assembly.

The actuator arrangement may be configured to cause relative movement between a diffuser vane array guide and the combined vane array assembly to adjust an effective axial height of the diffuser vanes in the compressor configuration by varying an open area of an inlet interface between the rotor and the diffuser vane array, and/or by varying an open area of an outlet interface at a radially outer side of the diffuser vane array, wherein the effective axial height is with respect to a rotational axis of the rotor.

The rotary assembly may further comprise a static seal between and/or around the diffuser vane array and/or the nozzle guide vane array.

According to a second aspect there is provided a gas turbine engine for an aircraft, the gas turbine engine comprising a rotary assembly in accordance with the first aspect.

According to a third aspect there is provided an aircraft comprising a rotary assembly in accordance with the first aspect or a gas turbine engine in accordance with the second aspect.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts (or spools) that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

According to an aspect, there is provided an aircraft comprising a rotary assembly or a gas turbine engine as described and/or claimed herein.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Examples will now be described with reference to the accompanying drawings, which are purely schematic and not to scale, and in which.

DETAILED DESCRIPTION

Figure 1:
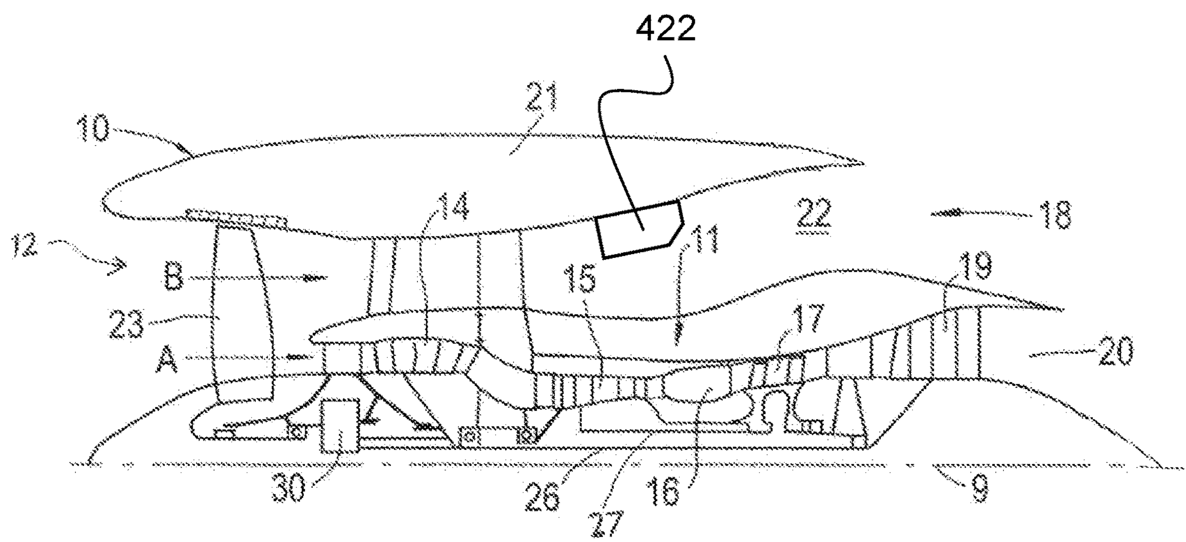
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
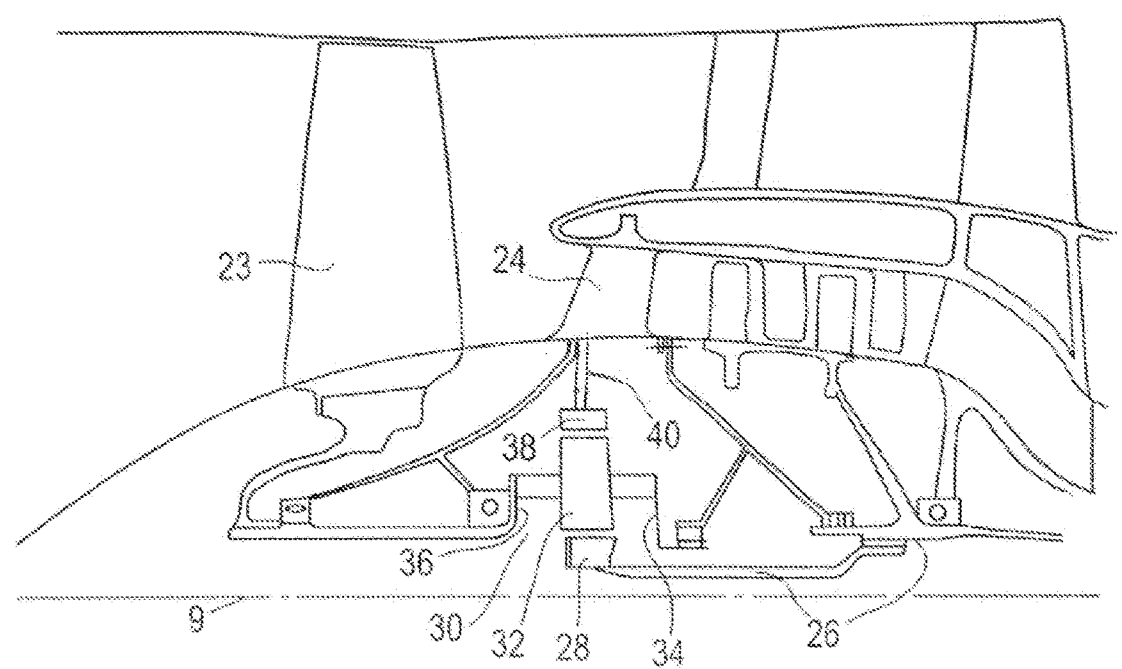
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26 (or spool), which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms “low pressure turbine” and “low pressure compressor” as used herein may be taken to mean the lowest pressure turbine stages and lowest pressure compressor stages (i.e., not including the fan 23) respectively and/or the turbine and compressor stages that are connected together by the interconnecting shaft 26 (or spool) with the lowest rotational speed in the engine (i.e., not including the gearbox output shaft that drives the fan 23). In some literature, the “low pressure turbine” and “low pressure compressor” referred to herein may alternatively be known as the “intermediate pressure turbine” and “intermediate pressure compressor”. Where such alternative nomenclature is used, the fan 23 may be referred to as a first, or lowest pressure, compression stage.

Figure 3:
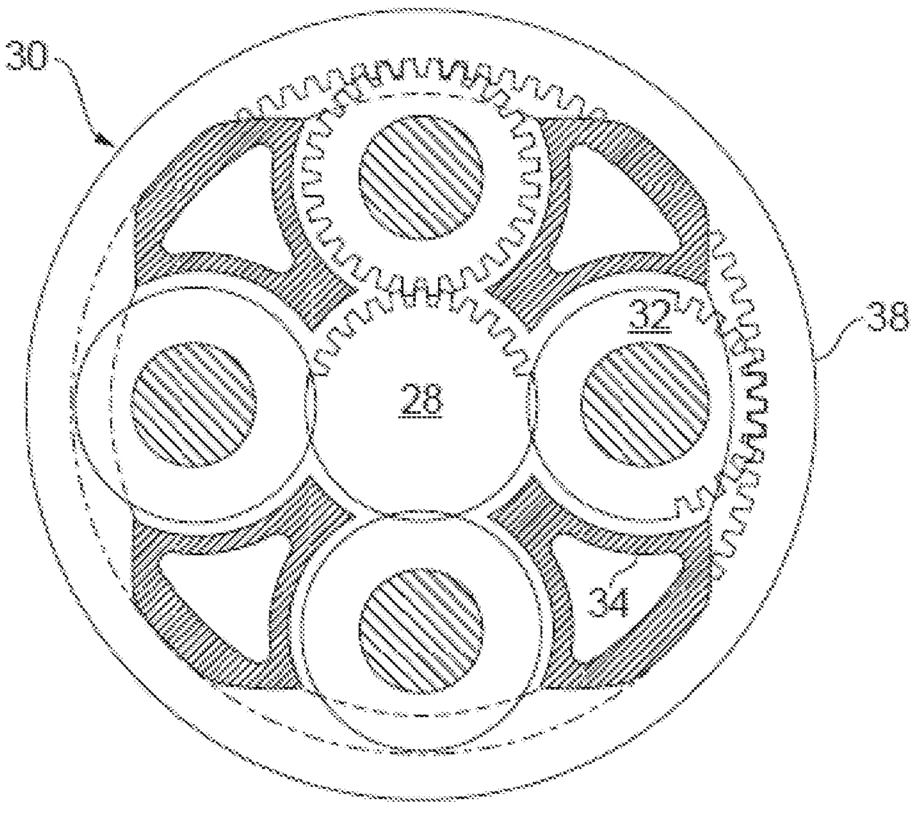
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g., the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
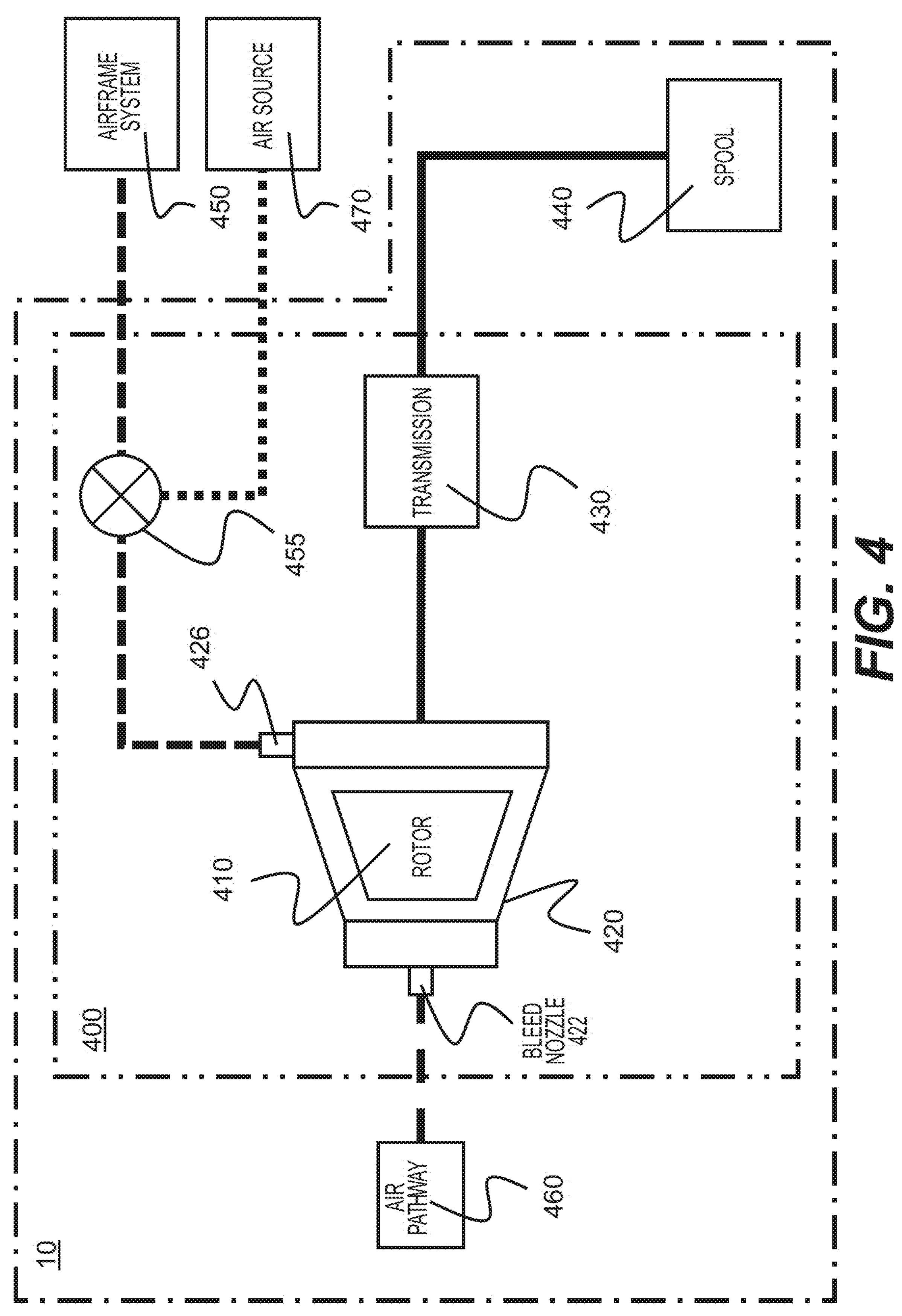
FIG. 4 is a diagram which shows an example rotary assembly.

A diagram of an example rotary assembly 400 is shown schematically in FIG. 4. The rotary assembly 400 is adapted to provide air to an airframe system, and may therefore be referred to as a blower assembly 400 or a cabin blower assembly 400. The rotary assembly 400 comprises a rotor 410 which is configured to be mechanically coupled to a spool 440 of a gas turbine engine. The spool may, for example, be the high-pressure (HP) spool of a two- or three-shaft gas turbine or an intermediate pressure (IP) spool of a three-spool engine, though any one or more spools of a gas turbine engine may be coupled to the rotor. The rotor 410 is disposed within a rotor housing 420. In the example of FIG. 4, the rotary assembly 400 comprises a variable transmission 430 for mechanically coupling the rotor 410 to the spool 440. The rotary assembly 400 is moveable between a compressor configuration and a turbine configuration by relative movement between the rotor 410 and a flow modifier. The rotary assembly 400 is therefore selectively operable in the compressor configuration and the turbine configuration.

The rotor 410 is configured to be driven to rotate by the spool 440 in the compressor configuration, whereby the rotary assembly 400 compresses air it receives from the gas turbine engine. The compressed air is discharged to an airframe discharge port 426 for supply to an airframe system 450 for an airframe pressurisation purpose. The airframe pressurisation purpose may be, for example, wing anti-icing, fuel tank inerting, cargo bay smoke eradication and/or aircraft cabin pressurisation. In the example of FIG. 4, the rotor is configured to receive air from the gas turbine engine via an engine bleed nozzle 422. The engine bleed nozzle 422 is in fluid communication with an air pathway (shown schematically at 460) of the gas turbine engine. Accordingly, in the compressor configuration, the rotary assembly 400 is configured to draw air from the air pathway 460 of the gas turbine engine and supply air to the airframe system 450, for example to pressurise and/or ventilate an aircraft cabin.

The rotary assembly 400 is configured to function as a compressor in the compressor configuration, such that air supplied to the airframe system 450 is at a higher pressure than air drawn from the air pathway 460 of the gas turbine engine. As a result, the rotary assembly 400 is not required to draw air from a relatively high pressure region of the gas turbine engine in order to supply pressurised air to the airframe system 450. Instead, the rotary assembly 400 may draw air via the engine bleed nozzle 422 from a relatively low pressure region of the gas turbine engine, such as from a bypass duct 22 of the gas turbine engine as shown in FIG. 1. If the rotary assembly 400 were alternatively required to draw air from a relatively high pressure region of the gas turbine engine (e.g., the high pressure compressor), an efficiency of the gas turbine engine may be reduced. Therefore, the rotary assembly 400 provides a more efficient airframe system pressurisation and ventilation system when incorporated into an aircraft. In addition, this approach reduces a scope for contamination of the air supply to the airframe system 450.

The rotor 410 is driven to rotate in the compressor configuration by the variable transmission 430, which itself receives drive input from the spool 440, for example through an accessory gearbox of the gas turbine engine. The speed of rotation of the spool 440 depends on the operating point of the gas turbine engine, which dictates a speed of the spool 440. The variable transmission 430 allows a rotational speed of the rotor 410 in the compressor configuration to be decoupled from a rotational speed of the spool 440, so that a compression performance of the rotary assembly 400 in the compressor configuration is not solely governed by the operating point of the gas turbine engine (e.g., it can be controlled to operate at a target speed independent of the rotational speed of the spool, and/or at a variable speed ratio relative to the rotational speed of the spool). Inclusion of a variable transmission 430 within the rotary assembly 400 therefore provides more versatile and adaptable means for supplying pressurised air to an airframe system. Various suitable variable transmission types will be apparent to those of ordinary skill in the art. For example, the variable transmission 430 may comprise an electric variator, as described in EP 3517436 B1.

The rotary assembly 400 is also configured to be able to receive compressed air from an external air source 470 to drive the spool 440 to rotate for cranking the gas turbine engine in the turbine configuration. In particular, the rotary assembly 400 may be configured to receive compressed air from an external air source 470 to drive the spool 440 to rotate for starting the gas turbine engine in the turbine configuration. In the example of FIG. 4, the rotary assembly is configured to receive compressed air from the external air source 470 via the airframe discharge port 426. In addition, the rotary assembly 400 further comprises an isolation valve 455 which is configured to isolate the airframe discharge port 426 from the external air source 470 in the compressor configuration, and to isolate the airframe discharge port 426 from the airframe system 450 in the turbine configuration. However, it will be appreciated that the rotary assembly 400 may otherwise be configured to receive compressed air from the external air source 470, such as via an external air port, for example.

The external air source 470 may be derived from, for example, an auxiliary power unit (APU) of the aircraft, ground starting equipment (GSE) or from another gas turbine engine of the aircraft (which may be referred to as a cross-bled source). In the example of FIG. 4, the rotary assembly 400 is configured to discharge air to the engine bleed nozzle 422 in the turbine configuration. However, the rotary assembly 400 may otherwise discharge air in the turbine configuration, such as to a dedicated auxiliary nozzle, for example. Air discharged from the rotary assembly 400 via a dedicated auxiliary nozzle may be used for cooling other systems and/or components of the gas turbine engine and/or the aircraft in the turbine configuration.

The rotary assembly 400 is configured to function as a turbine in the turbine configuration, such that the spool 440 may be driven to rotate by the rotor 410. Generally, the rotary assembly 400 can drive rotation of the spool 440 to a rotational speed which is sufficient to enable the gas turbine engine to successfully execute an ignition process (which may be referred to as a “light-up” speed). Consequently, the rotary assembly 400 dispenses with a need to provide a dedicated air turbine starting system or an electric starting system to the gas turbine engine, each of which are associated with additional weight and system complexity.

The use of a two-configuration rotary assembly 400 allows for an assembly in which the rotor 410 rotates in the same rotation direction (i.e., clockwise or anti-clockwise) in both the compressor configuration and the turbine configuration. In this way, in the turbine configuration of the rotary assembly 400 the rotor 410 will drive the spool 440 to rotate in the same direction that the spool 440 rotates when it drives the rotor 410 in the compressor configuration. The direction in which the rotor 410 rotates in both the compressor configuration and the turbine configuration is referred to as the primary (or desired) rotation direction herein. The opposite direction to the primary or desired rotation direction is referred to as the secondary (or non-desired) rotation direction. This allows for the omission of a separate reversing mechanism to permit the spool 440 to be driven to rotate in its starting direction, which will be the same as the direction it rotates during when driving the rotor 410 in the compressor configuration. A separate reversing mechanism would result in additional mechanical efficiency losses in, and increased weight of and/or a reduced reliability of, the rotary assembly 400.

FIG. 4 also schematically shows a gas turbine engine 10 comprising the first example rotary assembly 400. The gas turbine engine 10 may be in accordance with the gas turbine engine 10 described above with respect to FIG. 1 and/or FIG. 2.

Various examples of a rotary assembly in accordance with the rotary assembly 400 described above with respect to FIG. 4 will now be described with reference to FIGS. 5A-7C, with like reference numerals being used to indicate common features.

Figure 5A:
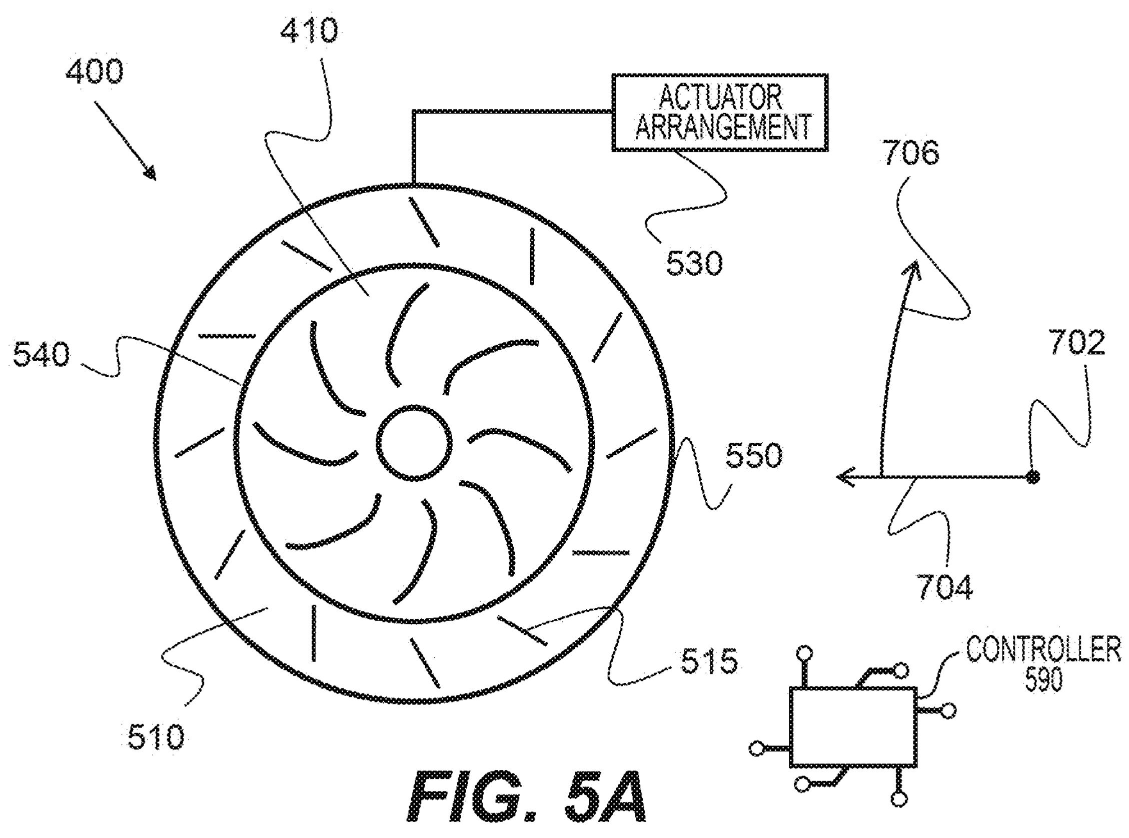
FIGS. 5A-5B show front views of an example rotary assembly in a compressor configuration and a turbine configuration, respectively.
Figure 5B:
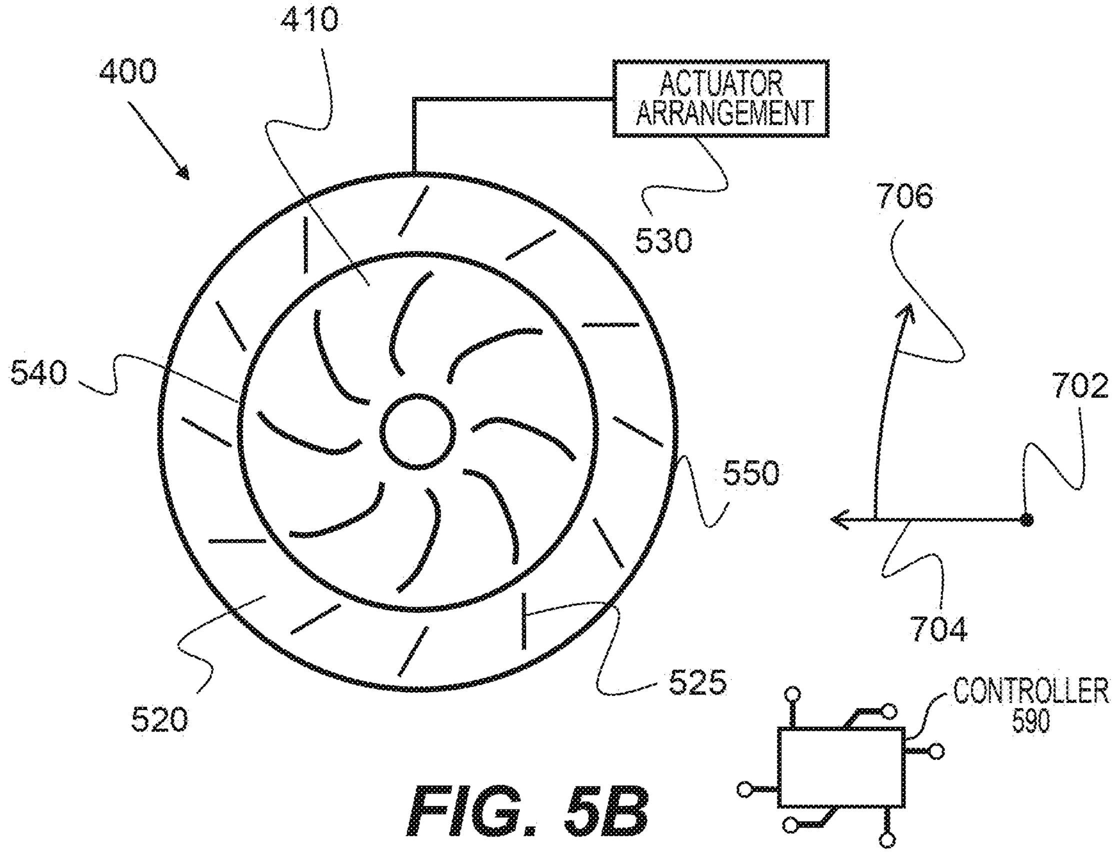

FIGS. 5A-5B show a front or axial view (with respect to a rotation axis of the rotor) of an example rotary assembly 400 in a compressor configuration and in a turbine configuration, respectively. The rotary assembly 400 comprises a rotor 410 configured to be mechanically coupled to a spool of a gas turbine engine. The rotary assembly 400 may be referred to according to a cylindrical co-ordinate system having an axial direction 702, a radial direction 704 and a circumferential direction 706. The axial direction 702 is defined as being coaxial with a rotational axis of the rotor 410 while the circumferential direction 706 corresponds to a direction of rotation of the rotor 410 in use. The radial direction 704 is mutually locally perpendicular to both the axial direction 702 and the circumferential direction 706.

In the example of FIGS. 5A-5B, the flow modifier of the rotary assembly 400 comprises a diffuser vane array 510 comprising a plurality of diffuser vanes 515, and a nozzle guide vane array 520 comprising a plurality of nozzle guide vanes 525.

In the compressor configuration, as shown in FIG. 5A, the diffuser vane array 510 is disposed around the rotor 410 and is configured to act together with the rotor 410 to compress air received at the rotor 410 by converting kinetic energy of air received from the rotor 410 into pressure energy. Conversely, in the turbine configuration, as shown in FIG. 5B, the nozzle guide vane array 520 is disposed around the rotor 410 and is configured to act together with the rotor 410 to expand air received at the nozzle guide vane array 520 by converting pressure energy of air received at the nozzle guide vane array 520 into kinetic energy and to guide the air at an optimised approach angle into the rotor 410.

A geometry of each of the plurality of diffuser vanes 515 of the array may be selected so as to optimise an aerodynamic performance of the diffuser vane array 510 without compromising an aerodynamic performance of the nozzle guide vane array 520. Likewise, a geometry of each of the plurality of nozzle guide vanes 525 may be selected so as to optimise an aerodynamic performance of the nozzle guide vane array 520 without compromising an aerodynamic performance (i.e., a turbine performance) of the nozzle guide vane array 510. Accordingly, an overall performance of the rotary assembly 400 in both the compressor configuration and the turbine configuration may be improved by providing dedicated flow modifiers for the respective modes of operation, rather than, for example, attempting to provide a single configuration through which the flow merely passes in different directions.

The geometries of each of the plurality of diffuser vanes 515 and of each of the plurality of nozzle guide vanes 525 is predetermined and fixed in use. It may be that angles of attack of each of the plurality of diffuser vanes 515 and of each of the plurality of nozzle guide vanes is predetermined and fixed in use. By providing a fixed configuration of the respective aerodynamic components, dynamic sealing losses associated with variable geometry and/or rotatable vanes may be eliminated or reduced, and the overall performance of the rotary assembly 400 may be improved in the compressor configuration and/or the turbine configuration relative to alternative rotary assemblies having such features.

The example rotary assembly 400 further comprises an actuator arrangement 530 configured to cause relative movement between the rotor 410 and the diffuser vane array 510 along the axial direction 702 so that the diffuser vane array 510 is disposed around the rotor 410 for operating in the compressor configuration. Similarly, the actuator arrangement 530 is also configured to cause relative movement between the rotor 410 and the nozzle guide vane array 520 so that the nozzle guide vane array 520 is disposed around the rotor 410 for operating in the turbine configuration.

According to the present disclosure, the actuator arrangement 530 is configured to cause relative movement between the rotor 410 and the flow modifier (e.g., the diffuser vane array 510 and the nozzle guide vane array 520) within the turbine configuration. In other words, the actuator arrangement 530 is further configured to cause comparatively small relative movement between the rotor 410 and the flow modifier along the axial direction 702 without causing the rotary assembly to be moved from the turbine configuration into the compressor configuration. The effect of relative movement between the rotor 410 and the flow modifier within the turbine configuration is explained below with reference to FIGS. 7A and 7B.

The actuator arrangement 530 may be further configured to adjust an effective axial height of the diffuser vanes 515 by varying an open area of an inlet interface 540 between the rotor 410 and the diffuser vane array 510, and/or by varying an open area of an outlet interface 550 at a radially outer side of the diffuser vane array 510, wherein the effective axial height of the diffuser vanes 515 is defined with respect to a rotational axis of the rotor 410. In some examples, the actuator arrangement 530 may be configured to adjust an effective axial height of the diffuser vanes 515 by varying a cross-sectional area of the diffuser vane array 510 at a location between the inlet interface 540 and the outlet interface 550. Accordingly, in the compressor configuration, a compression performance of the rotary assembly 400 may be adjusted to meet a compression demand associated with, for example, an airframe system.

The rotary assembly 400 is provided with (e.g., comprises) a controller 590 which is configured to control the actuator arrangement 530. For this purpose, the controller 590 may be configured to be in data communication (e.g., for transmitting control signals) with the actuator arrangement 530 by means of a wired or wireless connection. The controller 590 may be internal to (e.g., included within) the rotary assembly 400. However, this disclosure also envisages that the controller 590 may be external to the rotary assembly 400. If so, the controller 590 may, for example, form a part of an external control system such as an avionics system of a gas turbine engine or an aircraft in which the rotary assembly 400 is incorporated. The controller 590 is generally configured to control the actuator arrangement 530 to cause relative movement between the rotor 410 and the flow modifier and thereby move the rotary assembly 400 between being operable in the compressor configuration and being operable in the turbine configuration. Further, the controller 590 is configured to control the actuator arrangement 530 to cause relative movement between the rotor 410 and the flow modifier within the turbine configuration and thereby control a torque applied to the spool 440.

Example actuator arrangements 530 will now be described with reference to FIGS. 6A-8C, with like reference numerals being used to indicate common features. An example configuration of the controller 590 is described further with particular reference to FIGS. 7A-7C.

Figures 6A, 6B, 6C:
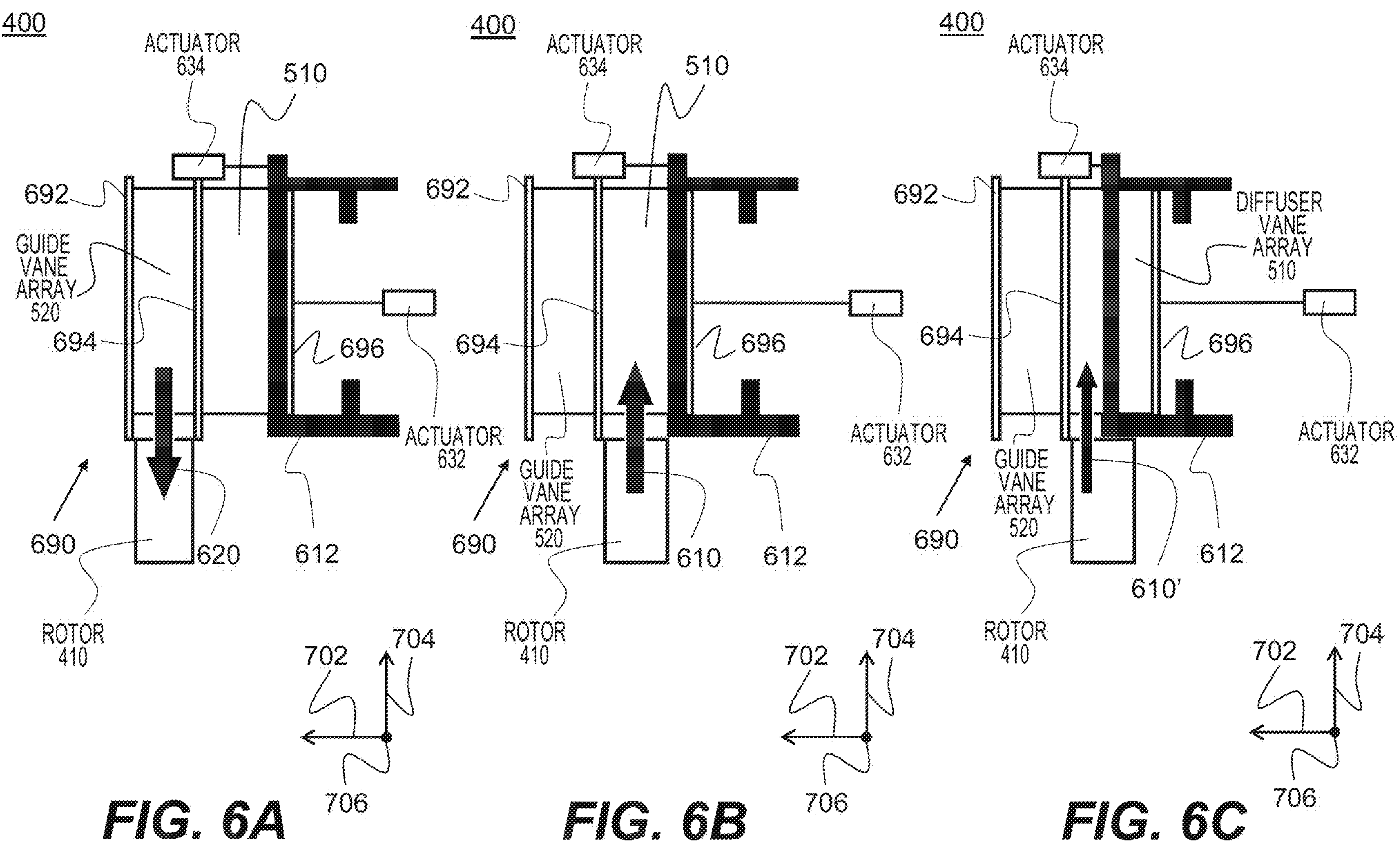
FIGS. 6A-6C show cross-sectional views of an example rotary assembly in the compressor configuration and the turbine configuration.

FIG. 6A shows a cross-sectional view of the rotary assembly 400 in the turbine configuration, corresponding to the front (or axial) view shown in FIG. 5B. In this example, the diffuser vane array 510 and the nozzle guide vane array 520 are rigidly connected so as to form a combined vane array assembly 690. The actuator arrangement 530 comprises a mode actuator 632 (i.e., an actuator to move the rotary assembly between the respective configurations for the respective different modes) and a diffuser height actuator 634, although in variant embodiments there may be no diffuser height actuator. The mode actuator 632 is configured to cause relative movement between the rotor 410 and the combined vane array assembly 690 for moving the rotary assembly 400 between the compressor configuration and the turbine configuration. In the turbine configuration, the nozzle guide vane array 520 is positioned with respect to the rotor 410 so as to allow air to flow through the nozzle guide vane array 520 and to the rotor 410 in a direction having a radially inward component (e.g., a compound tangential and radial direction), as indicated by the arrow 620. In this particular example, the combined vane array assembly 690 is configured to translate along an axial direction while the rotor 410 maintains a static axial position, such that the combined vane array assembly 690 may be referred to as a translating vane array assembly.

FIG. 6B shows a cross-sectional view of the rotary assembly 400 in the compressor configuration, corresponding to the front/axial view shown in FIG. 5A. By comparison of FIGS. 6A and 6B, the function of the mode actuator 632 in moving the combined vane array assembly 690 relative to the rotor 410 can be seen. In the compressor configuration, the mode actuator 632 has positioned the diffuser vane array 510 with respect to the rotor 410 so as to allow air to flow from the rotor 410 and through the diffuser vane array 510 in a direction having a radially outward component (e.g., a compound tangential and radial direction), as indicated by the arrow 610.

The diffuser height actuator 634 of this example is configured to cause relative movement between the diffuser vane array 510 and a diffuser vane array guide 612. A position of the diffuser vane array guide 612 governs an effective axial height of the diffuser vanes 515. Specifically, the position of the diffuser vane array guide 612 with respect to the diffuser vane array 510 governs a size of an open area of an inlet interface 540 between the rotor 410 and the diffuser vane array 510, and also governs the open area of the outlet 550 at a radially outer side of the diffuser vane array 510. That is, the position of the diffuser vane array guide 612 with respect to the diffuser vane array 510 governs a size of a cross sectional-area of the diffuser vane array 510 between the inlet interface 540 and the outlet interface 550.

Consequently, in the example of FIGS. 6A-6C, the diffuser height actuator 634 is configured to adjust the effective axial height of the diffuser vanes 515 by varying the open area of the inlet interface 540 and varying an open area of an outlet 550. However, it will be appreciated in other examples, that the diffuser height actuator 634 may only be configured to vary the open area of the inlet interface 540 or to vary the open area the outlet 550.

In FIGS. 6A and 6B, the diffuser vane array guide 612 is in a retracted position in which the diffuser vane array guide 612 is positioned so as not to reduce the effective axial height of the diffuser vanes 515 and thereby not to inhibit a flow of air from the rotor 410 through the diffuser vane array 510.

FIG. 6C shows another cross-sectional view of the rotary assembly 400 in the compressor configuration, corresponding to the front view shown in FIG. 5A. However, in FIG. 6C, the diffuser vane array guide 612 is in an extended position. Therefore, the diffuser vane array guide 612 is positioned so as to reduce the effective axial height of the diffuser vanes 515 and thereby inhibit a flow of air from the rotor 410 through the diffuser vane array 510 in the direction shown by the arrow 610'. In this way, the compression performance of the rotary assembly 400 may be adjusted to meet a compression demand and/or a flow demand associated with, for example, an airframe system.

By comparison of FIGS. 6B and 6C, the function of the diffuser height actuator 634 in moving the diffuser vane array guide 612 relative to the diffuser vane array 510 can be seen. The provision of both the reconfiguration actuator 632 and the diffuser height actuator 634 allows the diffuser vane array guide 612 to be moved between the retracted position and the extended position independently of whether the rotary assembly 400 is in the compressor configuration or the turbine configuration.

Further, at least one dynamic seal may be provided to the rotary assembly 400 proximal to and/or around the diffuser vane array 510 and/or the nozzle guide vane array 520 to minimise pressure losses associated with air leakages between the rotor 410 or the diffuser vane array 510 and an external environment in the compressor configuration and/or air leakages between the rotor 410 or the nozzle guide vane array 520 and the external environment in the turbine configuration.

In the examples of FIGS. 6A-6C, the diffuser vane array 510 and the nozzle guide vane array 520 are rigidly connected so as to form a combined vane array assembly 690. Accordingly, the flow modifier of the rotary assembly comprises the combined vane array assembly 690, and the two may be referred to interchangeably. The diffuser vane array 510 and the nozzle guide vane array 520 are separated by a septum plate 694. The diffuser vane array 510 is bounded by the septum plate 694 and a diffuser endplate 696, whereas the nozzle guide vane array 520 is bounded by the septum plate 694 and a nozzle guide vane endplate 692. However, it will be appreciated that in other examples, the diffuser vane array 510 and the nozzle guide vane array 520 may not be rigidly connected or may be otherwise connected, with one or more additional actuators being provided to the rotary assembly 400 causing relative movement between the rotor 410 and each vane array for operation in each configuration.

Figures 7A, 7B, 7C:
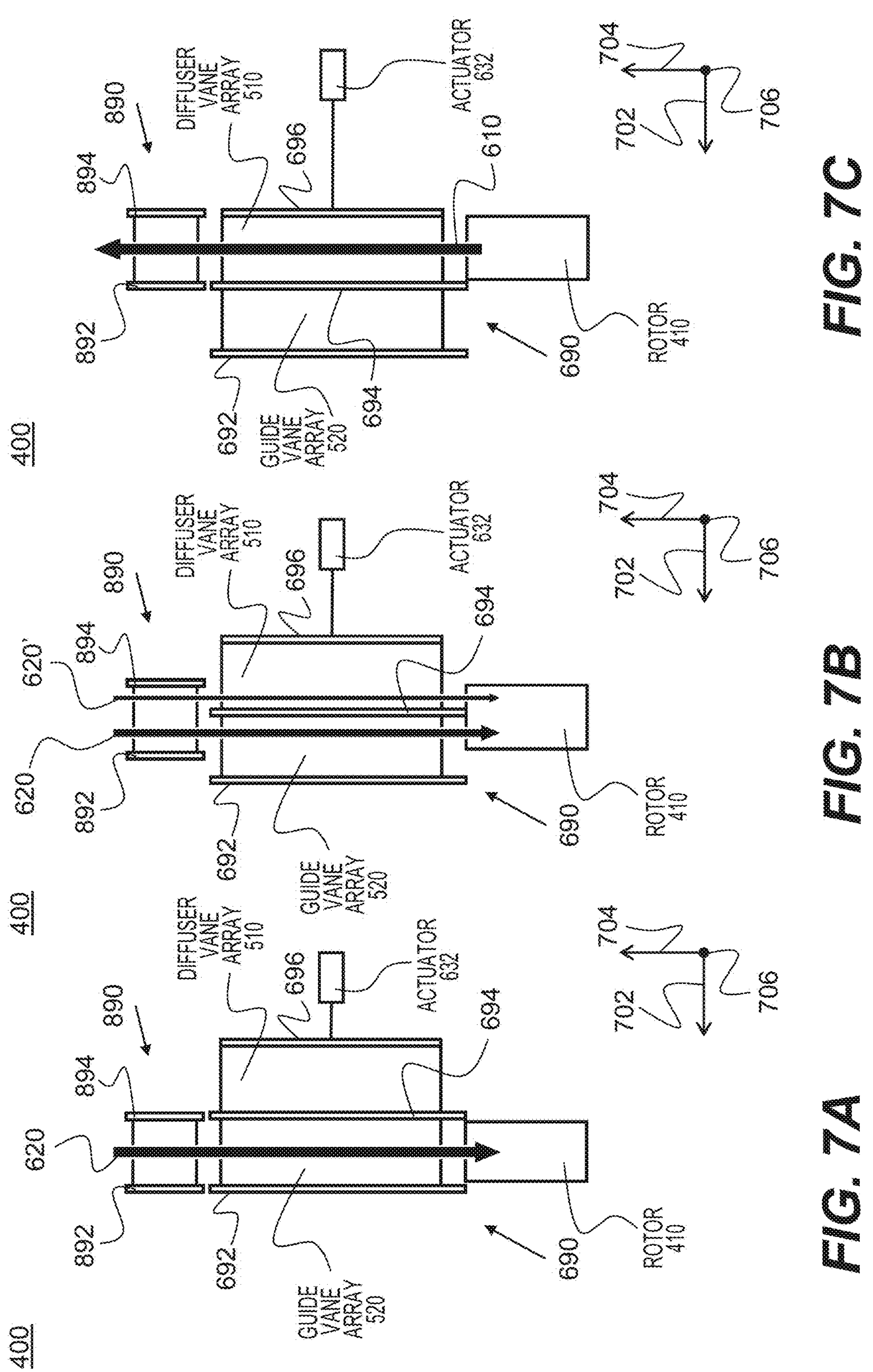
FIGS. 7A-7C show further cross-sectional views of the example rotary assembly of FIGS. 6A-6C.

FIGS. 7A-7C show further cross-sectional views of the example rotary assembly of FIGS. 6A-6C. Accordingly, like reference numerals indicate common or similar features. However, the diffuser height actuator 634 and the diffuser vane array guide 612 shown in FIGS. 6A-6C are not shown in FIGS. 7A-7C to aid further explanation of the features of the rotary assembly 400. In particular, in the example of FIGS. 7A-7C, the rotary assembly 400 comprises a flow director 890 which is in fluid communication with the airframe discharge port 426 (see FIG. 4) and is configured to be disposed relative to the combined vane array assembly 690 to selectively direct flow along respective paths as will be discussed below. The flow director 890 is annular around the combined vane array assembly 690 and is bounded at axial ends by a first flow director endplate 892 and a second flow director endplate 894. A position of the flow director 890 is substantially fixed along the axial direction 702 with respect to the rotor 410, such that the flow director 890 and the rotor 410 are substantially aligned with respect to each other in each of FIGS. 7A-7C irrespective of the position of the combined vane array assembly 690 along the axial direction 702 of the rotary assembly 400.

FIG. 7A shows a cross-sectional view of the rotary assembly 400 in the turbine configuration, corresponding to the front (or axial) view shown in FIG. 5B and the view shown in FIG. 6A. FIG. 7B shows a cross-sectional view of the rotary assembly 400 in the turbine configuration. The similarities and differences between FIGS. 7A and 7B are explained in detail below. FIG. 7C shows a cross-sectional view of the rotary assembly 400 in the compressor configuration, corresponding to the front (or axial) view shown in FIG. 5B and the view shown in FIG. 6B.

When the rotary assembly 400 is operated in the compressor configuration, as shown in FIG. 7C, the flow director 890 directs (by co-operation of the flow director endplates 892, 894) compressed air received from the rotor 410 via the flow modifier (that is, the combined vane array assembly 690) to the airframe discharge port 426 for supply to the airframe system 450. The direction of air in the compressor configuration is shown by the radially-outward arrow 610 in FIG. 7C.

Conversely, when the rotary assembly 400 is operated in the turbine configuration, as shown in both FIGS. 7A and 7B, the flow director 890 directs (by co-operation of the flow director endplates 892, 894) compressed air received from the external air source 470 via the airframe discharge port 426 into the flow modifier (that is, the combined vane array assembly 690) for supply to the rotor 410, along a radially-inward direction. The rotor 410 is then driven to rotate by the compressed air provided to it by the flow modifier, which may be referred to as a turbine function of the rotary assembly 400. The direction of air in the turbine configuration is indicated by arrows 620 and 620' in FIGS. 7A and 7B, as explained in further detail below. Further, it should be understood that if the rotary assembly 400 is configured to receive compressed air from the external air source 470 other than via the airframe discharge port, such as via an external air port as discussed above, the flow director 890 may be in fluid communication with the external air port so as to be able to direct compressed air received from the external air source 470 via the external air port into the flow modifier for supply to the rotor 410 when the rotary system 400 is in the turbine configuration.

As discussed above, both FIGS. 7A and 7B show a cross-sectional view of the rotary assembly 400 in the turbine configuration. However, a position of the flow modifier (that is, the combined vane array assembly 690) along the axial direction 702 relative to the rotor 410 and relative to the flow director 890 differs between FIG. 7A and FIG. 7B.

In FIG. 7A, the actuator arrangement 530 (e.g., the mode actuator 632) has been controlled by the controller 590 so as to align the nozzle guide vane array 520 with the flow director 890 and the rotor 410 such that all (e.g., substantially all) of the compressed air received from the external air source 470 via the flow director 890 is directed into the nozzle guide vane array 520 for supply to the rotor 410 along a radially-inward path as indicated by arrow 620. As discussed above, the nozzle guide vane array 520 is configured to act together with the rotor 410 to expand air received at the nozzle guide vane array 520 by converting pressure energy of air received at the nozzle guide vane array 520 into kinetic energy and to guide the air at an optimised approach angle into the rotor 410 when the rotary assembly 400 is operated in the turbine configuration. In particular, when the rotary assembly 400 is operated in the turbine configuration, air received from the flow director 890 is guided by the nozzle guide vane array 520 at an approach angle which applies a torque to the rotor 410 in the primary (or desired) rotation direction. The torque in the primary rotation direction may be referred to as a driving torque If all of the compressed air received from the external air source 470 is so directed into the nozzle guide vane array 520 for supply to the rotor 410, a maximum amount of the pneumatic energy of the compressed air received from the external air source 470 is imparted to the rotor 410 for rotation in the primary rotation direction. As a result, the position of the flow modifier shown in FIG. 7A may be referred to as a maximum torque turbine position of the turbine configuration of the rotary assembly 400. In the maximum torque turbine position, the driving torque applied the rotor 410 (and the spool 440) is at a maximum. In other words, the turbine function of the rotary assembly 400 is maximised in the maximum torque turbine position. The maximum torque turbine position may, for example, be used to rapidly accelerate the rotor 410 (and the spool 440) as required in use (e.g., to accelerate the spool 440 to the "light-up" speed of the gas turbine engine).

In FIG. 7B, the actuator arrangement 530 (e.g., the mode actuator 632) has been controlled by the controller 590 so as to offset alignment of the nozzle guide vane array 520 with the flow director 890 and the rotor 410 such that only a fraction of the compressed air received from the external air source 470 via the flow director 890 is directed into the nozzle guide vane array 520 for supply to the rotor 410, whilst a remaining fraction of the compressed air received from the external air source 470 via the flow director 890 is directed into the diffuser vane array 510 for supply to the rotor 410. Accordingly, the compressed air received from the external air source 470 via the flow director 890 is split between being directed to the rotor 410 via the nozzle guide vane array 520 and via the diffuser vane array 510. The relative proportions (e.g., the ratio of) of the compressed air received from external air source 470 which is directed into each of the nozzle guide vane array 520 and the diffuser vane array 510 may be referred to as a flow split. Accordingly, the controller 590 is configured to vary the driving torque applied to the rotor 410 by controlling relative movement between the rotor 410 and the flow modifier to vary the flow split discussed above.

If only a fraction of (i.e., less than substantially all of) the compressed air received from the external air source 470 is so directed into the nozzle guide vane array 520 for supply to the rotor 410, a reduced amount (compared to the maximum amount) of the pneumatic energy of the compressed air received from the external air source 470 is imparted to the rotor 410. As a result, the position of the flow modifier shown in FIG. 7B may be referred to as a limited torque turbine position of the turbine configuration of the rotary assembly 400. In the limited torque turbine position, the driving torque applied to the rotor 410 (and the spool 440) is reduced compared to the driving torque applied to the rotor 410 in the maximum torque turbine position. That is to say that the turbine function of the rotary assembly 400 is limited in the limited torque turbine position. As a result, the limited torque turbine position may be used to drive the rotor 410 (and the spool 440) to accelerate relatively slowly and/or to rotate at a steady-state speed below a starting speed of the engine (e.g., below the "light-up" speed of the gas turbine engine) as required in use. Although FIG. 7B shows the rotary assembly 400 in only one limited torque turbine position, there are a plurality of limited torque turbine positions of the turbine configuration through which the rotary assembly 400 may be moved by the actuator arrangement 530.

The actuator arrangement 530, as controlled by the controller 590, is operable to move the flow modifier along the axial direction 702 through a range of turbine positions to vary the torque applied to the rotor 410 for driving the spool 440 to rotate in the primary rotation direction. The range of turbine positions is defined between a minimum torque turbine position and the maximum torque turbine position. The maximum torque turbine position is as discussed above with reference to FIG. 7A. However, in the minimum torque turbine position, the flow modifier has been relatively moved along the axial direction 702 such that a minimum proportion of the effective axial height of the nozzle guide vanes 525 of the nozzle guide vane array 520 is exposed to the compressed air received from the external air source 470, as explained in further detail below. Further, the minimum torque turbine position corresponds to a turbine configuration of the rotary assembly 400 in which the driving torque applied to the rotor 410 is minimal (i.e., minimal in the context of all of the turbine positions through which the rotary assembly 400 may be moved). Otherwise, when the flow modifier is at an intermediate torque turbine position between the minimum torque turbine position and the maximum torque turbine position, the driving torque applied to the rotor 410 is between the minimum driving torque applied to the rotor 410 in the minimum torque turbine position and the maximum driving torque applied to the rotor 410 in the maximum torque turbine position.

As discussed above, the diffuser vane array 510 is configured to act together with the rotor 410 to compress air received at the rotor 410 by converting kinetic energy of air received from the rotor 410 into pressure energy when the rotary assembly 400 is operated in the compressor configuration. For this reason, the diffuser vane array 510 is dissimilar in structure to the nozzle guide vane array 520. In particular, the diffuser vane array 510 is not configured to act together with the rotor 410 to expand air received at the diffuser vane array 510 by converting pressure energy of air received at the diffuser vane array 510 into kinetic energy and/or to guide the air at an optimised approach angle into the rotor 410 when the rotary assembly 400 is operated in the turbine configuration. In particular, when the rotary assembly 400 is operated in the turbine configuration, air received from the flow director 890 is guided by the diffuser vane array 520 at an approach angle which applies a torque to the rotor 410 in the secondary (non-desired) rotation direction. The torque in the secondary rotation direction may be referred to as a braking torque. As a result, air which is supplied from the external air source 470 to the rotor 410 via the diffuser vane array 510 may oppose driving of the rotor 410 (and therefore the spool 440) to rotate in the primary rotation direction when the rotary assembly 400 is operated in the limited torque turbine position. Such opposition to driving of the rotor 410 may be described as aerodynamically braking, resisting or inhibiting the turbine function of the rotary assembly 400. A result of the braking torque being subtracted from the driving torque is referred to herein as a net driving torque.

As shown in FIG. 7B, in each of the limited torque turbine positions of the turbine configuration, the actuator arrangement 530 generally aligns the flow modifier with respect to the flow director 890 and the rotor 410 such that a greater proportion of the effective axial height of the nozzle guide vanes 525 of the nozzle guide vane array 520 is exposed to the compressed air received from the external air source 470 than a proportion of the effective axial height of the diffuser vanes 515 of the diffuser vane array 510. It follows that the fraction of air received by the flow modifier from the external air source 470 which is directed into the nozzle guide vane array 520 as indicated by arrow 620 is larger than the fraction of air received by the flow modifier from the external air source 470 which is directed into the diffuser vane array 510 as indicated by arrow 620' in each of the limited torque turbine positions of the turbine configuration of the rotary assembly 400.

The minimum torque turbine position of the turbine configuration of the rotary assembly 400 is defined as the position of the flow modifier (with respect to the flow director 890) in which the minimum proportion of the effective axial height of the nozzle guide vanes 525 is exposed to the compressed air received from the external air source 470 which ensures that the fraction of air received from the external air source 470 which is directed into the nozzle guide vane array 520 is larger than the fraction of air received from the external air source 470 which is directed into the diffuser vane array 510. The controller 590 controlling the actuator arrangement 530 so as to move the flow modifier between the range of turbine positions defined between the minimum torque turbine position and the maximum torque turbine position as defined herein therefore ensures that the fraction of air received from the external air source 470 which is directed into the nozzle guide vane array 520 is always maintained as greater than the fraction of air received from the external air source 470 which is directed into the diffuser vane array 510.

Because of the dissimilar structure of the diffuser vane array 510 and the nozzle guide vane array 520, if the fraction of air received from the external air source 470 directed into the nozzle guide vane array 520 were smaller than the remaining fraction of air received from the external air source 470 directed into the diffuser vane array 510, the turbine function of the rotary assembly 400 may be so greatly resisted that the rotor 410 (and therefore the spool 440) is not adequately driven to rotate and/or the rotor 410 (and the spool 440) is not able to rotate in the primary rotation direction whatsoever (or the rotor 410 is driven to rotate in the secondary rotation direction). This occurs when the braking torque is equal to, or greater than, the driving torque applied to the rotor 410 (that is, when the net driving torque is negative). Because the controller 590 is configured to control the actuator arrangement 530 such that that the fraction of air received from the external air source 470 which is directed into the nozzle guide vane array 520 is always greater than the fraction of air received from the external air source 470 which is directed into the diffuser vane array 510, this ensures that the driving torque is always greater than, or equal to, the braking torque (and so the net driving torque is always positive). Therefore, the rotor 410 (and the spool 440) is adequately driven to rotate in the primary rotation direction in each of the plurality of the limited torque turbine positions of the rotary assembly 400.

In general, as the flow modifier is moved through the range of turbine positions toward the minimum torque turbine position, the flow split between air received via the nozzle guide vane array and via the diffuser vane array is varied such that the fraction of compressed air received via the nozzle guide vane array 520 is decreased while the fraction of compressed air received via the diffuser vane array 510 is increased. The driving torque applied to the rotor 410 (and therefore the spool 440) is accordingly reduced as the actuator arrangement 530 moves the flow modifier toward the minimum torque turbine position, whereas the braking torque applied to the rotor 410 (and therefore the spool 440) is simultaneously increased. Therefore, the controller 590 is configured to control the actuator arrangement 530 to cause relative movement between the rotor 410 and the flow modifier so as to move the rotary assembly 400 within the range of turbine positions between the maximum torque turbine position and the minimum torque turbine position which results in the respective fractions of compressed air received from the external air source 470 which are directed to the rotor 410 via the nozzle guide vane array 520 and the diffuser vane array 510 being simultaneously varied for the purpose of controlling the net driving torque applied to the rotor 410 (and the spool 440). This arrangement allows the net driving torque applied to the rotor 410 (and the spool 440) to be effectively controlled while using only a limited travel between the range of turbine positions.

In summary, by increasing the fraction of compressed air provided to the rotor 410 via the nozzle guide vane array 520, the driving torque applied to the rotor 410 (and the spool 440) is increased and vice versa. Those skilled in the art will appreciated that when the driving torque applied to the rotor 410 (and the spool 440) is increased, a rotational power transmitted through the rotor 410 (and the spool 440) is increased correspondingly. By controlling relative movement between the rotor 410 and the flow modifier through the range of turbine positions, the controller 590 is configured to vary the torque applied to the rotor 410 for driving the spool 440 in the primary rotation direction.

Although it has been described that the actuator arrangement 530 is controlled by the controller 590 (within the turbine configuration of the rotary assembly 400) so as to vary the fraction of air received from the external air source 470 via the nozzle guide vane array 520 and simultaneously vary the fraction of air received via the diffuser vane array 510 (i.e., to vary the flow split between compressed air received by the flow modifier from the external air source which is directed to the rotor via the nozzle guide vane array and via the diffuser vane array), this need not necessarily be the case. For instance, it may be that the controller 590 is not configured to vary the fraction of compressed air received by the flow modifier from the external air source 470 which is directed to the rotor 410 via the diffuser vane array 510 (within the turbine configuration of the rotary assembly 400).

By way of example, if the diffuser vane array 510 and the nozzle guide vane array 520 are not rigidly connected, the actuator arrangement 530 may be controlled by the controller 590 so as to only realign the nozzle guide vane array 520 with the flow director 890 and the rotor 410 such that a fraction of the compressed air received from the external air source 470 via the flow director 890 is directed into the nozzle guide vane array 520 for supply to the rotor 410 whilst a remaining fraction of the compressed air received from the external air source 470 via the flow director 890 is directed other than into the diffuser vane array 510 (such as through a gap between the nozzle guide vane array 520 and the diffuser vane array 510). If so, the controller 590 is configured to vary (e.g., reduce) the driving torque applied to the rotor 410 (and the spool 440) by controlling relative movement between the rotor 410 and the flow modifier within the range of turbine positions to vary (e.g., reduce) the fraction of compressed air received by the flow modifier from the external air source 470 which is directed to the rotor 410 via the nozzle guide vane array 520 without varying the fraction of compressed air received by the flow modifier from the external air source 470 which is directed to the rotor 410 via the diffuser vane array 510.

Figures 8A, 8B, 8C:
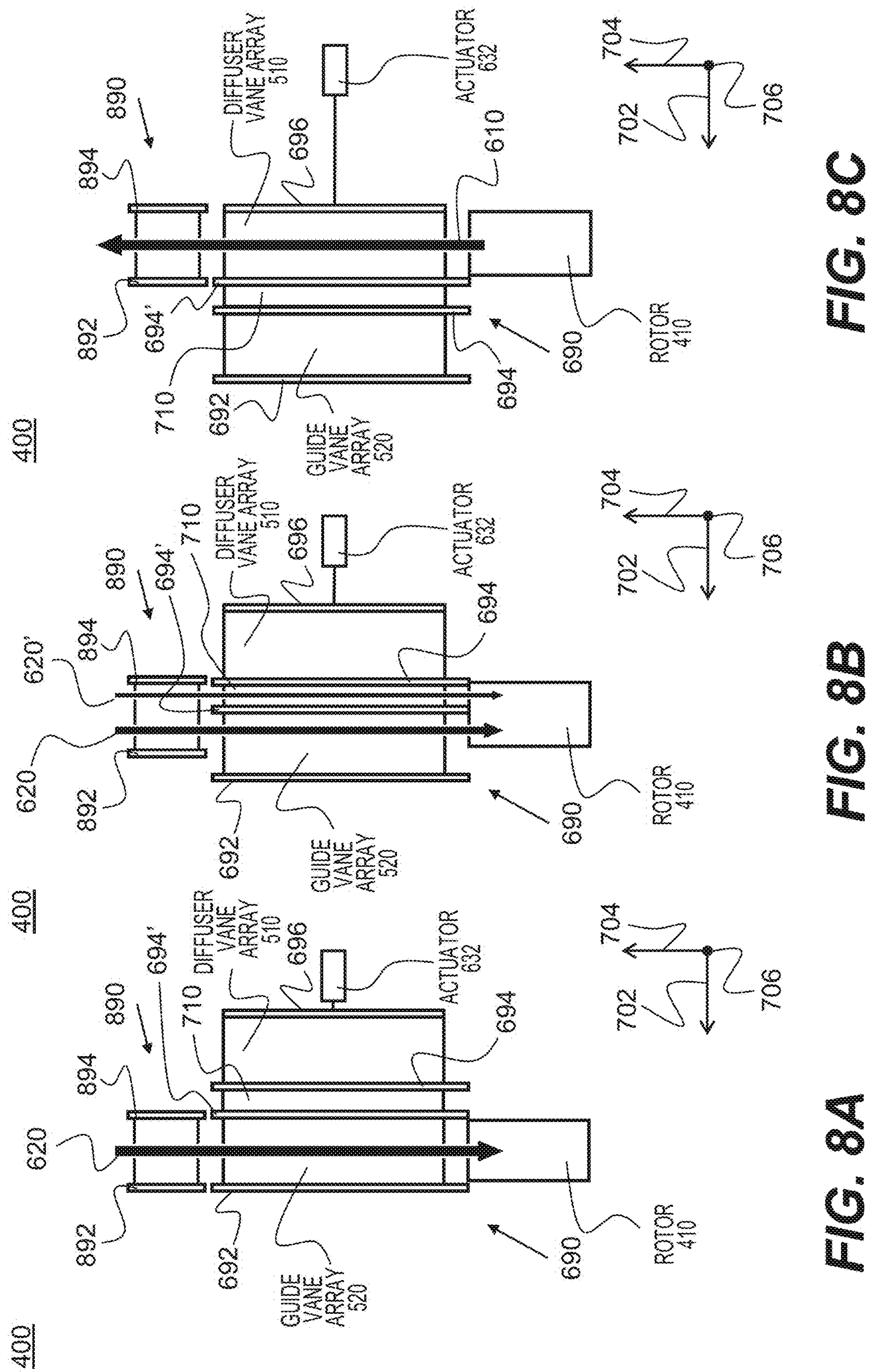
FIGS. 8A-8C show cross-sectional views of a variant of the example rotary assembly of FIGS. 6A-6C and FIGS. 7A-7C.

FIGS. 8A-8C show further cross-sectional views of a variant of the example rotary assembly of FIGS. 6A-7C. FIG. 8A shows a cross-sectional view of the rotary assembly 400 in the turbine configuration, corresponding to the front (or axial) view shown in FIG. 5B and the views shown in FIGS. 6A and 7A. FIG. 8B shows a cross-sectional view of the rotary assembly 400 in the turbine configuration, corresponding to the view shown in FIG. 7B. FIG. 8C shows a cross-sectional view of the rotary assembly 400 in the compressor configuration, corresponding to the front (or axial) view shown in FIG. 5B and the views shown in FIGS. 6B and 7C. Accordingly, like reference numerals indicate common or similar features.

In the variant example of FIGS. 8A-8C, an additional channel 710 is disposed between the diffuser vane array 510 and the nozzle guide vane array 520, with the diffuser vane array 510, the nozzle guide vane array 520 and the additional channel 710 being rigidly connected so as to form the combined vane array assembly 690. The additional channel 710 comprises a plurality of brake vanes which are configured to guide air received from the flow director 890 at an approach angle which applies a torque to the rotor 410 in the secondary rotation direction. As above, the torque in the secondary rotation direction may be referred to as a braking torque. The brake vanes may be specifically adapted for the purpose of applying a strong braking torque to the rotor 410 when the rotary assembly 400 is operated in the turbine configuration. Consequently, the additional channel 710 may be referred to as a brake vane array 710. The diffuser vane array 510 and the brake vane array 710 are separated by a first septum plate 694, whereas the nozzle guide vane array 520 and the brake vane array 710 are separated by a second septum plate 694'. Further, the diffuser vane array 510 is bounded by the first septum plate 694 and a diffuser endplate 696, whereas the nozzle guide vane array 520 is bounded by the second septum plate 694' and a nozzle guide vane endplate 692.

In some examples, there may be a plurality of such additional channels 710 (e.g., a plurality of brake vane channels 710), each additional channel being disposed between the diffuser vane array 510 and the nozzle guide vane array 520.

The actuator arrangement 530 may be controlled by the controller 590 (within the turbine configuration of the rotary assembly 400) so as to vary the fraction of air received from the external air source 470 via the nozzle guide vane array 520 and simultaneously vary the fraction of air received via the brake vane array(s) 710 to vary the flow split between compressed air received by the flow modifier 690 from the external air source which is directed to the rotor 410 via the nozzle guide vane array 520 and via the brake vane array(s) 710.

As will be understood by those skilled in the art, a gas turbine engine may be prone to rotor bow effects due to uneven cooling or heating of the rotor. Rotor bow may be especially likely to form during a shut-down process of the gas turbine engine. When bowing occurs, a bowed engine rotor condition has formed. A gas turbine engine which includes a relatively large number of high-pressure compressor stages may be particularly likely to enter a bowed engine rotor condition during a shut-down process or a start-up process thereof.

In a previously-considered rotary assembly, the isolation valve 455 is configured to control a mass flow and a pressure of an air flow from the external air source 470 to the airframe discharge port 426 and thereby control a torque applied to the spool 440 in the turbine configuration. In particular, the isolation valve 455 may be configured to control the torque applied to the spool 440 a somewhat lower level than that required for engine starting when the rotary assembly is in the turbine configuration, for example to promote cooling of the rotor(s) of the gas turbine engine. The isolation valve 455 may be controlled to prevent the formation of a bowed engine rotor condition following engine shutdown, to reduce a bowed engine rotor condition prior to engine start or to execute a smooth acceleration (or deceleration) of the spool 440 during a managed engine start-up process or a managed engine shut-down process. If so, the isolation valve 455 may be referred to as a start control and isolation valve (SCIV) 455.

In contrast, according to the present disclosure, control of the torque applied to the spool 440 in the turbine configuration is instead achieved by the cooperation of the controller 590, the flow modifier, the rotor 410 and the actuator arrangement 530 to selectively operate the rotary assembly 400 through the range of turbine positions between the maximum torque turbine position and the minimum torque turbine position. Therefore, the isolation valve 455 need not be configured to vary the torque applied to the spool 440 in the turbine configuration in order to execute a managed engine start-up process or a managed engine shut-down process as described above. Consequently, a complexity and/or an installation mass of the isolation valve 455 (and of the rotary assembly 400 as a whole) may be reduced. Further, this may increase a reliability of the isolation valve 455 and therefore of the rotary assembly 400 as a whole. In addition, the torque applied to the rotor 410 (and the spool 440) in the turbine configuration of the rotary assembly 400 may be precisely and effectively controlled. This may be particularly advantageous in the context of gas turbine engines having degraded and/or worn compressor stages, and which therefore benefit from precise control of the torque applied thereto during a managed engine start-up process.

In examples according to the present disclosure, the controller 590 may be configured to vary the torque (e.g., the driving torque or the net driving torque) applied to rotor 410 (and the spool 440) based on a rotational speed of the rotor 410, a rotational speed of the spool 440, the torque applied to the rotor 410 or the torque applied the spool 440 based on signals received from appropriate sensing apparatus. For instance, the controller 590 may be configured to vary the torque applied to the rotor 410 (and therefore the spool 440) to ensure that the torque applied to the rotor 410 or the spool 440 remains below an upper torque threshold relating to a maximum torque which may be applied to the rotor 410 or the spool 440. The maximum torque may be defined by, for instance, a torque rating of a gearbox of the gas turbine engine. When a managed engine start-up process is first initiated, it may be that the torque applied to the rotor 410 or the spool 440 is a liable to exceed the upper torque threshold. Therefore, the controller 590 may control the actuator arrangement 530 as described herein to maintain the torque applied to the rotor 410 or the spool 440 so as to maintain the applied torque below the upper torque threshold and thereby reduce a risk of damage to the rotary assembly 400 or the gas turbine engine.

In addition or instead, the controller 590 may be configured to vary the torque applied to the rotor 410 (and the spool 440) to ensure that a steady-state speed or the rotor 410 or the spool 440 does not correspond to a resonant frequency of a component of the rotary assembly 400 or the gas turbine engine. For instance, the controller 590 may be configured to control such as a turbine disk, a compressor the torque applied to the rotor 410 (and the spool 440) to ensure that a steady-state speed or the rotor 410 (or the spool 440) does not correspond to a resonant frequency of a turbine disk, a compressor disk and/or a gearbox of a gas turbine engine in which the rotary assembly 400 is incorporated. This may reduce a risk of damage to the components of the rotary assembly 400 and/or the gas turbine engine during a managed engine start-up or managed engine shut-down process.

Otherwise, the controller 590 may be configured to vary the torque applied to the rotor 410 (and the spool 440) by means of the actuator arrangement 530 to prevent the formation of a bowed engine rotor condition following engine shutdown or to reduce a bowed engine rotor condition prior to engine start. To this end, the actuator arrangement 530 may be controlled by the controller 590 such that the spool 440 of the gas turbine engine rotates at a relatively low steady-state speed which facilitates the removal or reduction of the bowed engine rotor condition prior to accelerating the spool 440 to the "light-up" speed of the gas turbine engine.

In other examples according to the present disclosure, the controller 590 may be configured to vary the torque applied to rotor 410 (and the spool 440) based on a external torque demand signal. The controller 590 may receive the external torque demand signal from an external system such as an avionics system of a gas turbine engine or an aircraft to which the rotary assembly 400 is provided.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein. The scope of protection is defined in the appended claims.

The invention claimed is:

1. A rotary assembly for driving spool rotation, comprising:

a rotor configured to be mechanically coupled to a spool of a gas turbine engine; and a flow modifier configured to receive flow from and/or direct flow to the rotor, wherein the rotary assembly is configured to permit relative movement along an axial direction of the rotor between the rotor and the flow modifier to move between:

a turbine configuration in which the rotor is configured to receive air from an external air source to drive the spool to rotate; and a compressor configuration in which the rotor is configured to be driven to rotate by the spool and to receive and compress air from the gas turbine engine, and discharge the compressed air for supply to an airframe system, the rotary assembly further comprises a controller configured to control relative movement along the axial direction of the rotor between the rotor and the flow modifier through a range of turbine positions of the turbine configuration to vary a torque applied to the rotor for driving the spool, the flow modifier comprises:

a diffuser vane array comprising a plurality of diffuser vanes and configured to act together with the rotor to compress air received at the rotor in the compressor configuration; and a nozzle guide vane array comprising a plurality of nozzle guide vanes and configured to act together with the rotor to expand air received at the nozzle guide vane array from a flow director in the turbine configuration, the controller is configured to:

cause relative movement between the rotor and the diffuser vane array so that the diffuser vane array is disposed around the rotor for operation in the compressor configuration; and cause relative movement between the rotor and the nozzle guide vane array so that the nozzle guide vane array is disposed around the rotor for operation in the turbine configuration, and the nozzle guide vane array is not disposed around the rotor in the compressor configuration, and the diffuser vane array is not disposed around the rotor in the turbine configuration.

2. The rotary assembly according to claim 1, wherein the controller is configured to vary the torque applied to the rotor based on:

a rotational speed of the rotor; or a rotational speed of the spool.

3. The rotary assembly according to claim 1, wherein the flow modifier is a fixed geometry flow modifier.

4. The rotary assembly according to claim 1, wherein the controller is configured to vary the torque applied to the spool by controlling relative movement between the rotor and the flow modifier within the range of turbine positions to vary a fraction of air received by the flow modifier from the external air source which is directed to the rotor via the nozzle guide vane array.

5. The rotary assembly according to claim 1, rein the controller is configured to reduce the torque applied to the rotor by controlling relative movement between the rotor and the flow modifier within the range of turbine positions to reduce a fraction of air received by the flow modifier from the external air source which is directed to the rotor via the nozzle guide vane array.

6. The rotary assembly according to claim 1, wherein the controller is configured to vary the torque applied to the rotor by controlling relative movement between the rotor and the flow modifier within the range of turbine positions to vary a flow split between air received by the flow modifier from the external air source which is directed to the rotor via the nozzle guide vane array and via the diffuser vane array.

7. The rotary assembly according to claim 6, wherein the controller is configured to reduce the torque applied to the rotor by controlling relative movement between the rotor and the flow modifier within the range of turbine positions to vary the flow split between air received by the flow modifier from the external air source which is directed to the rotor via the nozzle guide vane array and via the diffuser vane array such that:

a fraction of air received by the flow modifier from the external air source which is directed to the rotor via the nozzle guide vane array is decreased; and a fraction of air received by the flow modifier from the external air source which is directed to the rotor via the diffuser vane array is increased.

8. The rotary assembly according to claim 6, wherein the controller is configured to control relative movement between the rotor and the flow modifier to maintain a fraction of air received by the flow modifier from the external air source which is directed to the rotor via the nozzle guide vane array as being greater than the fraction of air received by the flow modifier from the external air source which is directed to the rotor via the diffuser vane array when the rotary assembly is operated in the turbine configuration.

9. The rotary assembly according to claim 1, wherein the diffuser vane array and the nozzle guide vane array are rigidly connected so as to form a combined vane array assembly.

10. The rotary assembly according to claim 1, wherein the nozzle guide vane array is configured to guide air received from the flow director at an approach angle which applies a driving torque to the rotor in a primary rotation direction;

the flow modifier further comprises a brake vane array comprising a plurality of brake vanes and configured to guide air received from the flow director at an approach angle which applies a braking torque to the rotor in a secondary rotation direction, the secondary rotation direction being opposite to the primary rotation direction;

whereby the torque applied to the rotor for driving the spool is a net driving torque which is equal to a result of the braking torque being subtracted from the driving torque.

11. The rotary assembly according to claim 10, wherein the brake vane array is disposed between the diffuser vane array and the nozzle guide vane array.

12. The rotary assembly according to claim 10, wherein the controller is configured to vary the net driving torque applied to the rotor by controlling relative movement between the rotor and the flow modifier within the range of turbine positions to vary a flow split between air received by the flow modifier from the external air source which is directed to the rotor via the nozzle guide vane array and via the brake vane array.

13. The rotary assembly according to claim 12, wherein the controller is configured to reduce the net driving torque applied to the rotor by controlling relative movement between the rotor and the flow modifier within the range of turbine positions to vary the flow split between air received by the flow modifier from the external air source which is directed to the rotor via the nozzle guide vane array and via the brake vane array such that:

a fraction of air received by the flow modifier from the external air source which is directed to the rotor via the nozzle guide vane array is decreased; and a fraction of air received by the flow modifier from the external air source which is directed to the rotor via the brake vane array is increased.

14. The rotary assembly according to claim 12, wherein the diffuser vane array, the brake vane array and the nozzle guide vane array are rigidly connected so as to form a combined vane array assembly.

15. The rotary assembly according to claim 9, wherein the controller is configured to cause relative movement between a diffuser vane array guide and the combined vane array assembly to adjust an effective axial height of the diffuser vanes in the compressor configuration by varying an open area of an inlet interface between the rotor and the diffuser vane array, and/or by varying an open area of an outlet interface at a radially outer side of the diffuser vane array, wherein the effective axial height is with respect to a rotational axis of the rotor.

16. The rotary assembly according to claim 14, wherein the controller is configured to cause relative movement between a diffuser vane array guide and the combined vane array assembly to adjust an effective axial height of the diffuser vanes in the compressor configuration by varying an open area of an inlet interface between the rotor and the diffuser vane array, and/or by varying an open area of an outlet interface at a radially outer side of the diffuser vane array, wherein the effective axial height is with respect to a rotational axis of the rotor.

17. A gas turbine engine for an aircraft, the gas turbine engine comprising the rotary assembly of claim 1.

18. A rotary assembly for driving spool rotation, comprising:

a rotor configured to be mechanically coupled to a spool of a gas turbine engine; and a flow modifier configured to receive flow from and/or direct flow to the rotor, wherein the rotary assembly is configured to permit relative movement along an axial direction of the rotor between the rotor and the flow modifier to move between:

a turbine configuration in which the rotor is configured to receive air from an external air source to drive the spool to rotate; and a compressor configuration in which the rotor is configured to be driven to rotate by the spool and to receive and compress air from the gas turbine engine, and discharge the compressed air for supply to an airframe system, the rotary assembly further comprises a controller configured to control relative movement along the axial direction of the rotor between the rotor and the flow modifier through a range of turbine positions of the turbine configuration to vary a torque applied to the rotor for driving the spool, the flow modifier comprises:

a diffuser vane array comprising a plurality of diffuser vanes and configured to act together with the rotor to compress air received at the rotor in the compressor configuration; and a nozzle guide vane array comprising a plurality of nozzle guide vanes and configured to act together with the rotor to expand air received at the nozzle guide vane array from a flow director in the turbine configuration, the controller is configured to:

cause relative movement between the rotor and the diffuser vane array so that the diffuser vane array is disposed around the rotor for operation in the compressor configuration; and cause relative movement between the rotor and the nozzle guide vane array so that the nozzle guide vane array is disposed around the rotor for operation in the turbine configuration, and the diffuser vane array and the nozzle guide vane array are arranged at positions different from each other along the axial direction of the rotor.

* * * * *